(12) United States Patent
Hamasaki et al.

(10) Patent No.: US 7,441,964 B2
(45) Date of Patent: Oct. 28, 2008

(54) OPTICAL GUIDE HOLDING MEMBER AND OPTICAL MODULE

(75) Inventors: Hiroshi Hamasaki, Hiratsuka (JP); Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/531,922

(22) Filed: Sep. 14, 2006

(65) Prior Publication Data

US 2007/0081769 A1  Apr. 12, 2007

(30) Foreign Application Priority Data

Sep. 29, 2005  (JP) .............................. 2005-285185

(51) Int. Cl.
*G02B 6/36* (2006.01)
(52) U.S. Cl. .......................................... 385/89; 385/88
(58) Field of Classification Search ........................ None
See application file for complete search history.

(56) References Cited

U.S. PATENT DOCUMENTS

| | | | | |
|---|---|---|---|---|
| 5,359,686 A * | 10/1994 | Galloway et al. | ............. | 385/49 |
| 6,267,514 B1 | 7/2001 | Chen et al. | | |
| 2005/0063651 A1 | 3/2005 | Hamasaki et al. | | |
| 2005/0141824 A1 | 6/2005 | Furuyama et al. | | |
| 2005/0169596 A1 | 8/2005 | Hamasaki et al. | | |
| 2005/0230795 A1 | 10/2005 | Furuyama et al. | | |
| 2006/0039658 A1 | 2/2006 | Furuyama et al. | | |
| 2006/0045434 A1 | 3/2006 | Numata et al. | | |
| 2006/0140534 A1 * | 6/2006 | Liu et al. | ....................... | 385/14 |
| 2006/0291783 A1 * | 12/2006 | Hamasaki et al. | ............. | 385/88 |

FOREIGN PATENT DOCUMENTS

| | | |
|---|---|---|
| CN | 1113608 A | 12/1995 |
| CN | 1637449 A | 7/2005 |
| JP | 10-170762 | 6/1998 |
| JP | 2001-159724 | 6/2001 |
| KR | 1995-0009288 | 4/1995 |
| KR | 2001-0041265 | 5/2001 |

* cited by examiner

*Primary Examiner*—Sung H Pak
(74) *Attorney, Agent, or Firm*—Oblon, Spivak, McClelland, Maier & Neustadt, P.C.

(57) ABSTRACT

The present invention provides an optical guide holding member having holding holes in which optical guides are fitted and held. The optical guide holding member has electric leads buried in a mounting surface on which the openings of the holding holes are opened. The electric leads are partly exposed on the mounting surface, and are also exposed on a side surface crossing the mounting surface. The optical semiconductor device is electrically connected to the exposed part of electric leads and is optically coupled with the optical guides.

17 Claims, 5 Drawing Sheets

OPTICAL GUIDE HOLDING MEMBER AND OPTICAL MODULE

CROSS-REFERENCE TO RELATED APPLICATIONS

This application is based upon and claims the benefit of priority from prior Japanese Patent Application No. 2005-285185, filed Sep. 29, 2005, the entire contents of which are incorporated herein by reference.

BACKGROUND OF THE INVENTION

1. Field of the Invention

The present invention relates to an optical semiconductor module used for an optical communication or transmission system, and in particular, to an optical guide holding member and an optical module having an improved electric wiring.

2. Description of the Related Art

In recent years, an optical transmission and communication techniques is developed and widely applied in various field, in which a light beam is utilized as a carrier and is intensity-modulated or phase-modulated to transmit signals. In such optical transmission and communication techniques, it is required to provide an optical coupling apparatus that optically couples a semiconductor device such as a light emitting or receiving element to optical guides such as optical fibers.

For this type of apparatus, a technique has been studied and developed which uses a coupling scheme called direct optical coupling (butt joint) to reduce implementation costs; this technique arranges a group of optical fibers and an optical semiconductor device immediately close to and opposite each other to achieve optical coupling without any lenses. The direct optical coupling requires the group of optical fibers and the semiconductor device to be arranged as close as several tens of μm to each other. Thus, for example, JP-A 2001-159724 (Kokai) proposes a method of producing electric wiring directly on a principal surface of an optical guide holding member (what is called an optical fiber ferrule) that holds optical fibers or the like and mounting an optical device on the principal surface so that a light sensitive region or an emitting region of the optical device is opposite the optical fibers.

This method enables the optical semiconductor device to be placed very close to the optical fibers. The optical semiconductor device can also be mounted on the optical guide holding member with respect to the optical fibers. This enables the optical semiconductor device to be precisely mounted also in a lateral direction by using a normal flip-chip implementation scheme. Nevertheless, the resulting structure has a reduced number of parts and allows costs to be readily reduced. Moreover, production costs can be sharply reduced by using resin as a base material for the holding member. When electric wiring is formed on a principle surface with openings for optical fibers and then extended to a side surface, an orthogonal arrangement is realized which enables an electric signal to be output in a direction orthogonal to a propagation path for the optical beam. This enables the optical fibers to extend parallel to a mounting surface of a mounting board, thus preventing the optical fibers from extending perpendicularly to the mounting surface.

In the optical module described in JP-A 2001-159724 (Kokai), it is required that the optical module is mounted on a mounting board so as to arrange the optical fibers parallel to the mounting surface of the mounting board. Thus, the electric wiring is required to be formed three-dimensionally on the principal surface of the optical guide holding member, on which the optical semiconductor device is mounted, and the electric wiring is also required to be extended from the principal surface to a side surface. Consequently, this structure has a disadvantage that the process of manufacturing electric wiring involves a three-dimensional process. This disadvantageously complicates the process and increases costs.

In the structure described in JP-A 2001-159724 (Kokai), the electric wiring is formed into an L-shape along an outer surface of the optical guide holding member and is electrically connected to a bonding wire on a side surface of the optical guide holding member. Consequently, a bonding operation exerts a strain on the base material of the optical guide holding member through electrode portions of the electric wiring. On the other hand, to inexpensively manufacture an optical guide holding member, resin can be effectively used as a base material and is adopted for many products. In this case, since the base material is resin, stress may strain the base material so that the base material caves in. This makes it difficult to achieve stable bonding, and in the worst case, the electrode parts may be strained and open-circuited.

According to an aspect of the present invention, there is provided an optical module comprising:

an optical guide;

a member having a first surface and a second surface adjacent to the first surface and a through hole having an opening on the first surface, the through hole being extended in the main body and the optical guide being held in the through hole;

electrical leads each having one and opposite ends, which are buried in the main body, have a part exposed on the first surface, and are arranged in the main body such that the opposite end of the electric lead being exposed on the second surface; and an optical semiconductor device mounted on the first surface and having electrodes which are electrically connected to the exposed part of the electrical leads. In FIG. 1, reference numeral 1 denotes a member that holds optical guides, for example, optical fibers. The holding member 1 has a main body formed in a rectangular block having a principal surface, i.e., a mounting surface 8 and an opposite surface. Through holes 2 are formed in the main body and are arranged substantially parallel in the main body. The holding holes 2 are opened on a principal surface 8 and the opposite surface of the main body. The optical guides are inserted from the openings on the opposite surface into the through holes 2 so that the optical guides are held in the through holes 2, respectively. The holding member 1 also has electric leads 3 buried in the main body of the holding member 1 at the principal surface side. The openings 4 of the through holes 2 are arranged in line on the principal surface 8 and the end faces of the optical guides are positioned in the openings 4 on the principal surface 8 so that the end faces of the optical guides are arranged in line on the principal surface. The ends of the optical guides are exposed as optical input or output ports from the openings 4. An optical device is mounted on the mounting surface 8.

A drive element that drives the optical semiconductor device is connected, by bonding or the like, to the ends of wires 5 and 7 exposed from a side surface 32 of the optical guide holding member 1. The end of each wire 7 exposed from another side surface opposite the side surface 32 is connected to a mounting board 17 via bumps 20 (see FIG. 6). The electric leads 3, i.e., the signal wires 5 and common wires 7 are initially coupled together via tie bars 13. With a fine electrode pattern, the electrodes have a small width so that it is difficult to ensure the strength of the pattern. Thus, auxiliary tie bars 11 may be preferably provided on the lead frame 10 of fine electrode pattern so as to be close to the optical guide holding member 1 and the signal wires 5 and common wires 7 may be coupled together via the auxiliary tie bars 11 to ensure the strength of the pattern, as shown in FIG. 2. Reference numeral 12 denotes a positioning hole for the lead frame 10. The pattern for one optical guide holding member is shown in FIG. 2. However, in the lead frame 10, shown in FIG. 2, similar patterns are arranged above and below and coupled together, and another other optical guide holding members (not shown) may be also arranged in accordance with the patterns. on a side surface of the optical guide holding member. Consequently, a bonding operation exerts a strain on the base material of the optical guide holding member through electrode portions of the electric wiring. On the other hand, to inexpensively manufacture an optical guide holding member, resin can be effectively used as a base material and is adopted for many products. In this case, since the base material is resin, stress may strain the base material so that the base material caves in. This makes it difficult to achieve stable bonding, and in the worst case, the electrode parts may be strained and open-circuited.

BRIEF SUMMARY OF THE INVENTION

According to an aspect of the present invention, there is provided a holding member for holding an optical guide, comprising:

a member having a first surface and a second surface adjacent to the first surface, and a through hole having an opening on the first surface, the through hole being extended in the main body so as to hold the optical guide; and electrical leads each having one and opposite ends, which are buried in the main body so as to be partly exposed on the first surface and are arranged in the main body such that the opposite end of the electric lead being exposed on the second surface.

According to an aspect of the present invention, there is provided an optical module comprising:

an optical guide;

a member having a first surface and a second surface adjacent to the first surface and a through hole having an opening on the first surface, the through hole being extended in the main body and the optical guide being held in the through hole;

electrical leads each having one and opposite ends, which are buried in the main body, has a part exposed on the first surface, and are arranged in the main body such that the opposite end of the electric lead being exposed on the second surface; and an optical semiconductor device mounted on the first surface and having electrodes which are electrically connected to the exposed part of the electrical leads.

DETAILED DESCRIPTION OF THE INVENTION

With reference to the drawings, there will be described an optical guide holding member and an optical module according to embodiments of the present invention.

First Embodiment

Figure 1:
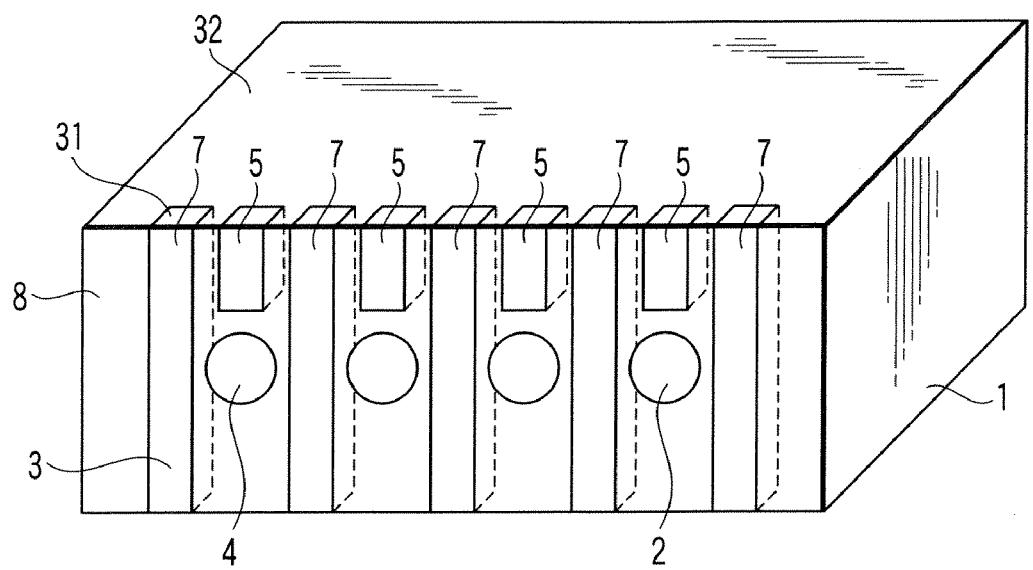
FIG. 1 is a perspective view schematically showing an optical guide holding member according to a first embodiment of the present invention.

FIG. 1 is a perspective view schematically showing an optical guide holding member according to a first embodiment of the present invention.

In FIG. 1, reference numeral 1 denotes a member that holds optical guides, for example, optical fibers. The holding member 1 has a main body formed in a rectangular block having a principal surface, i.e., a mounting surface 8 and an opposite surface. Through holes 2 are formed in the main body and are arranged substantially parallel in the main body. The holding holes 2 are opened on a principal surface 8 and the opposite surface of the main body. The optical guides are inserted from the openings on the opposite surface into the through holes 2 so that the optical guides are held in the through holes 2, respectively. The holding member 1 also has electric leads 3 buried in the main body of the holding member 1 at the principal surface side. The openings 4 of the through holes 2 are arranged in line on the principal surface 8 and the end faces of the optical guides are positioned in the openings 4 on the principal surface 8 so that the end faces of the optical guides are arranged in line on the principal surface. The ends of the optical guides are exposed as optical input or output ports from the openings 4. An optical device is mounted on the mounting surface 8.

The main body of the optical guide holding member 1 is formed by injecting, into a mold, an insulating material, for example, an epoxy resin into which about 80% of glass filler of about 3 to 30 µm size is mixed. Each of the electric leads 3 is made of a conductive material, for example, Cu, a Cu alloy, a 42 alloy, or an invar material. The surface of the electric lead 3 is plated with a single layer made of a material selected from a group of Ni, Au, AgSn, AuSn, SnAgCu, SnZnBi, SnAgIn, SnBiAg, or SnPb, or a multilayer of a combination of materials selected from a group of Ni, Au, AgSn, AuSn, SnAgCu, SnZnBi, SnAgIn, SnBiAg, or SnPb, The electric leads 3 are at least partly exposed in order to mount an optical semiconductor device on the mounting surface 8. The electric leads 3 are electrically connected to the optical semiconductor device 14. The electric leads 3 desirably include alternately arranged signal wires 5 and common wires 7. Thus, each of the openings 4 and each of the signal wires 5 are located between the common wires 7. The signal wires 5 are used to lead out high-speed signals, and the common wires 7 are used for a power source or ground. This structure reduces the crosstalk between the signal wires 5. Opposite ends, that is, cut faces, of each common wire 7 are exposed from respective side surfaces 32 adjacent to the mounting surface 8, to form exposed portions 31. One of the ends of each signal wire 5 similarly forms an exposed portion 31. The surface of the exposed portion 31 may be plated. The plating material is made of a single layer of, for example, Ni, Au, AgSn, AuSn, SnAgCu, SnZnBi, SnAgIn, SnAgIn, SnBiAg, or SnPb, or a multilayer of a combination of any of these materials.

A drive element that drives the optical semiconductor device is connected, by bonding or the like, to the ends of wires 5 and 7 exposed from a side surface 32 of the optical guide holding member 1. The end of each wire 7 exposed from another side surface opposite the side surface 32 is connected to a mounting board 17 via bumps 20 (see FIG. 6).

This structure can substantially provide a formation of orthogonal wiring from the mounting surface 8 to the side surface 32 without any special three-dimensional processes. The optical guide holding member 1 can thus be easily mounted at its surface, i.e., the side surface, parallel to optical guides. This structure also enables the side surface 32 to receive stress resulting from bonding, in a longitudinal direction of the electric leads 3. Consequently, stable three-dimensional electric connections can be established which can avoid a possible open circuit or inappropriate bonding caused by sinking of the base material.

The structure shown in FIG. 1 can be formed through a process described below with reference to FIGS. 2 to 4.

Figure 2:
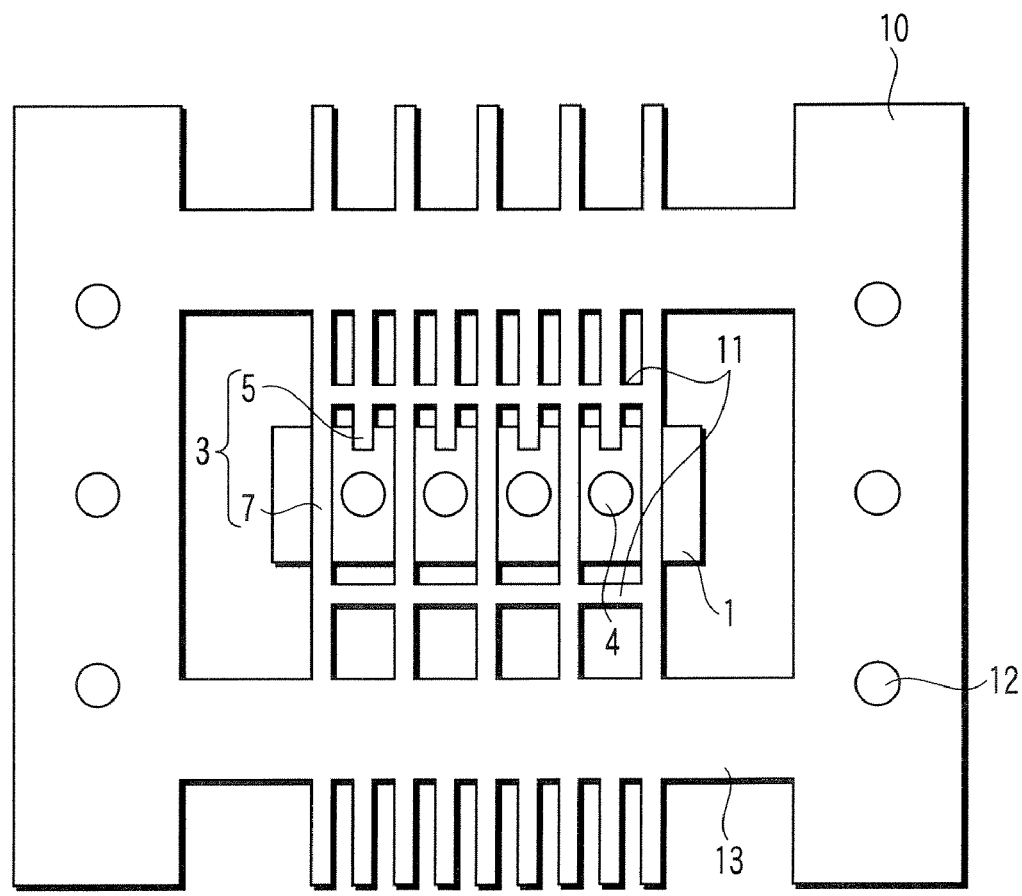
FIG. 2 is a plan view schematically showing a lead frame which is placed on the optical guide holding member shown in FIG. 1 during a process of manufacturing the optical guide holding member.
Figure 3:
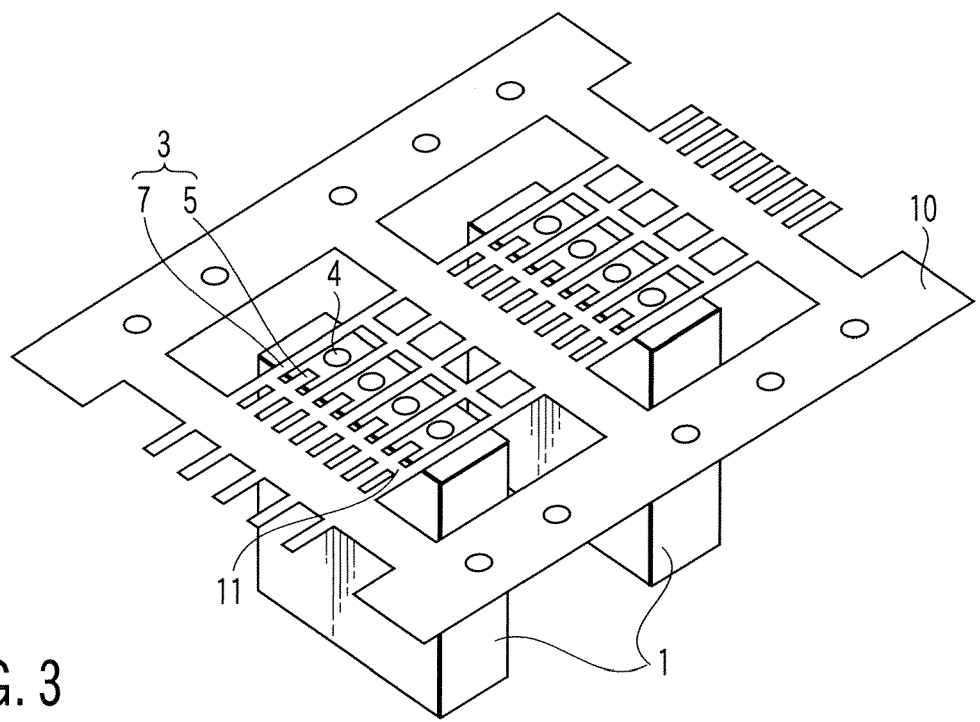
FIG. 3 is a perspective view schematically showing the lead frame shown in FIG. 1.

In FIG. 2, reference numeral 10 denotes a lead frame consisting of Cu. A pattern of the electric leads 3 is formed on the lead frame. The pattern of the electric lead 3 may be formed by etching or punching. Preferably, the formation of the electric lead 3 pattern by etching allows recesses and protrusions to be easily formed on a cross section of the lead frame 10. In insert molding of resin, the recesses and protrusions bite into the resin to provide a high anchor function.

The electric leads 3, i.e., the signal wires 5 and common wires 7 are initially coupled together via tie bars 13. With a fine electrode pattern, the electrodes have a small width so that it is difficult to ensure the strength of the pattern. Thus, auxiliary tie bars 11 may be preferably provided on the lead frame 10 of fine electrode pattern so as to be close to the optical guide holding member 1 and the signal wires 5 and common wires 7 may be coupled together via the auxiliary tie bars 11 to ensure the strength of the pattern, as shown in FIG. 2. Reference numeral 12 denotes a positioning hole for the lead frame 10. The pattern for one optical guide holding member is shown in FIG. 2. However, in the lead frame 10, shown in FIG. 2, similar patterns are arranged above and below and coupled together, and other optical guide holding members (not shown) may be also arranged in accordance with the patterns.

As shown in FIG. 2, a mold for the optical guide holding member 1 is aligned with the lead frame 10, and resin is inserted into the mold. In this case, continuous injection molding using a hoop may be carried out. After the molding, the lead frame 10 is fixed to the optical guide holding members 1 formed, as shown in FIG. 3. The lead frame 10 is cut away from this structure to the external shape of the optical guide holding member 1, to produce one optical guide holding member 1. The holding member 1 is subsequently completed by polishing the side surfaces to remove burrs and plating the structure with Au or the like.

Figure 4:
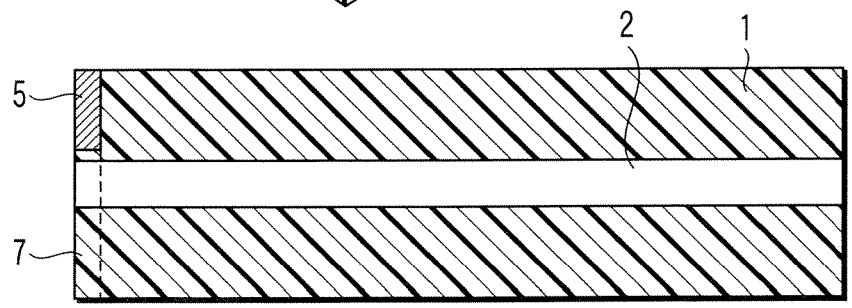
FIG. 4 is a sectional view schematically showing a cross section of the optical guide holding member shown in FIG. 1.

FIG. 4 shows the sectional structure of the optical guide holding member 1. As shown in FIG. 4, one of the cut surfaces of each signal wire 5 is exposed from a side surface of the holding member 1. Both cut surfaces of each common wire 7 are exposed from the respective side surfaces of the optical guide holding member 1.

The signal wires 5 and common wires 7 are cut away from the lead frame 10 immediately close to the optical guide holding member 1. The wires 5 and 7 are then polished in order to remove burrs. In this process, the electric leads 3, forming the wires 5 and 7, are made of a material different from the base material of the optical guide holding member 1. This results in a difference in polishing speed between the electric lead 3 and the optical guide holding member 1. The polished surface is thus not always flat. Further, plating after the polishing tends to project the electrodes, that is, the wiring potion, from the side surface. Thus, the side surface may not be flat but may instead be inclined. Thus, if the side surface is mounted on a mounting board, a step (not shown) of preferably about 50 μm height may be preformed on the side surface of the optical guide holding member 1. Then, in the member provided with the step, a lower portion of the side surface may be polished and the other portion of the side surface is maintained to be flat as the mounting surface.

Thus, according to the present embodiment, an inexpensive structure enabling an optical semiconductor device to be directly assembled can be realized simply by burying the electric leads 3 in a principal surface of the optical guide holding member 1, that is, the mounting surface 8. This structure eliminates the need of three-dimensional wiring in which the electric leads is extended from the mounting surface 8 to the side surface 32 and on which the optical semiconductor device is mounted. That is to say, this structure enables electrode pads for electrode lead-out to be provided on the side surface 32 simply by burying the linear electric leads 3 in the mounting surface 8 and exposing the lead ends from the side surface 32. Thus, the optical fibers can be inexpensively mounted parallel to the mounting surface without any special processes.

This structure enables stress on the side surface 32 resulting from bonding to be received in a longitudinal direction of the electric leads 3. This provides stable three-dimensional electric connections that can avoid a possible open circuit or inappropriate bonding caused by sinking of the base material.

Second Embodiment

Figure 5:
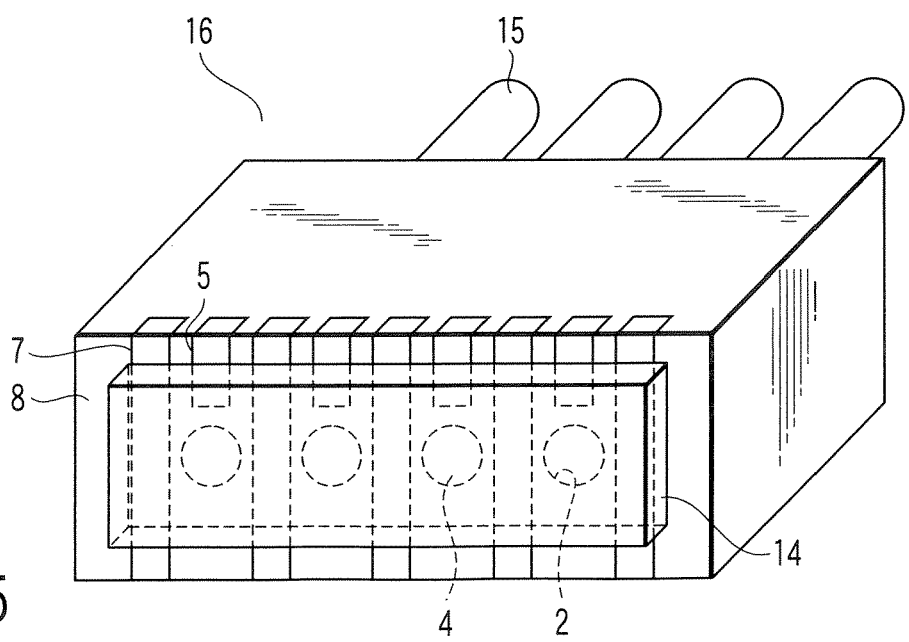
FIG. 5 is a perspective view schematically showing an optical module according to a second embodiment of the present invention.

FIG. 5 is a perspective view schematically showing an optical module according to a second embodiment of the present invention. In the description of the optical module according to the second embodiment, the same components as those shown in FIG. 1 are denoted by the same reference numerals. Their detailed description is thus omitted.

The optical guide holding member 1 has a structure similar to that in the first embodiment. An optical semiconductor device 14 is mounted, via stud bumps (not shown), on the electric wiring 3, that is, the signal wires 5 and common wires 7, on the mounting surface 8 of the optical guide holding member 1 so that a light sensitive and emitting surface are opposite the openings 4. Optical guides such as optical fibers 15 are then fixedly inserted into the holding holes 2 to produce an optical module 16. This structure eliminates the need to three-dimensionally wire the electric leads, on which the optical semiconductor device is mounted, from the mounting surface 8 to the side surface 32. That is to say, this structure enables electrode pads for electrode lead-out to be provided on the side surface 32 simply by burying the linear electric leads 3 in the mounting surface 8 and exposing the lead ends from the side surface 32. Thus, an optical module can be obtained in which the optical fibers are inexpensively mounted parallel to the mounting surface without any special processes.

This structure enables stress exerted on the side surface 32 as a result of bonding to be received in the longitudinal direction of the electric leads 3. This makes it possible to establish three-dimensional electric connections that can avoid a possible open circuit or inappropriate bonding caused by sinking of the base material.

Figure 6:
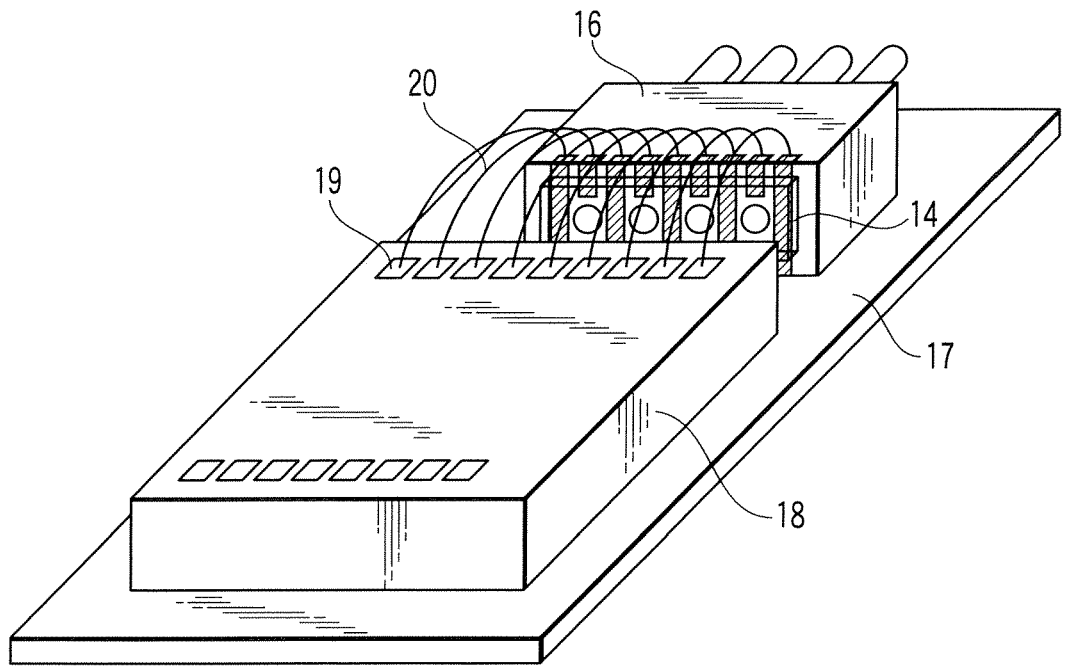
FIG. 6 is a perspective view schematically showing an arrangement structure in which the optical module shown in FIG. 5 is mounted on a mounting board.

FIG. 6 is a perspective view showing an assembly in which the optical module shown in FIG. 5 is mounted on the mounting board. The optical module 16 shown in FIG. 5 is assembled on the mounting board 17. The optical module 16 is electrically connected, via Au wires 20 or the like, to electrode pads 19 on a driving IC 18 placed immediately close to the optical module 16, utilizing leads exposed from a side surface of the optical module 16, as electrode pads. This arrangement produces the same effects as those of orthogonal wiring three-dimensionally formed. A small and inexpensive optical assembly can thus be formed.

Figure 7:
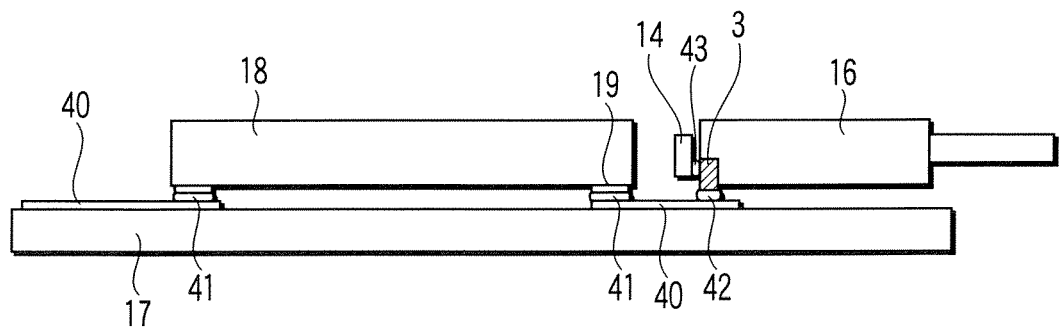
FIG. 7 is a sectional view showing an arrangement structure in which the optical module shown in FIG. 5 is implemented as a flip-chip circuit.

FIG. 7 shows an example of a flip-chip implementation structure which allows wiring length to be minimized to deal with high-speed signals. Electric wiring 40 is formed on the mounting board 17, and each member is connected to the electric wiring 40. In other words, the optical module 16, shown in FIG. 5, is mounted by connecting the end surfaces of the electric leads 3 to the electric wiring 40 via bumps 42; the electric leads 3 are exposed from the side surface of the optical module 16. The optical semiconductor device 14 is pre-mounted on the electric leads 3 via bumps 43. The driving IC 18 is also mounted by connecting it to the electric wiring 40 via bumps 41.

This arrangement enables a reduction in the length of a path for analog signals flowing between the device driving IC 18 and the optical semiconductor device 14. The arrangement can thus deal with faster signals.

Third Embodiment

Figure 8:
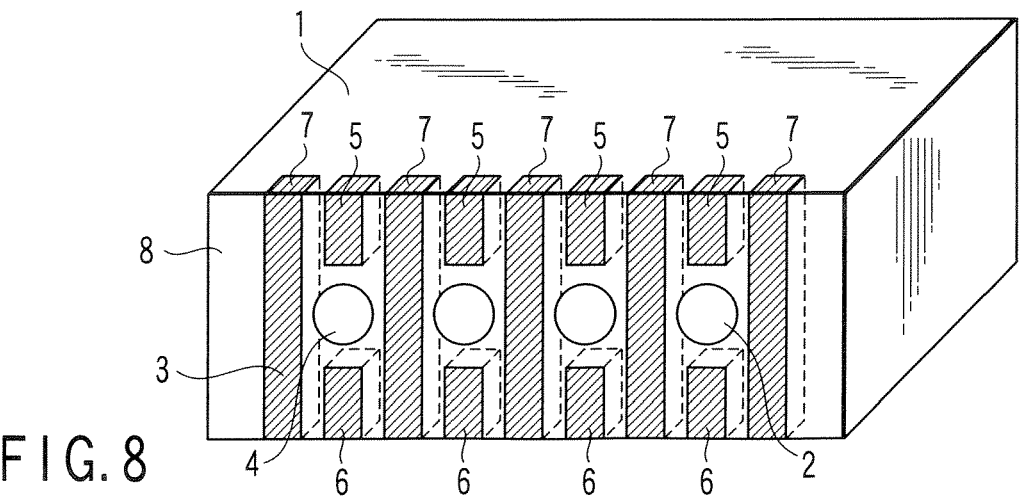
FIG. 8 is a perspective view schematically showing an optical guide holding member according to a third embodiment of the present invention.

FIG. 8 is a perspective view schematically showing an optical guide holding member according to a third embodiment of the present invention. In the description of an optical module according to the third embodiment, the same components as those shown in FIG. 1 are denoted by the same reference numerals. Their detailed description is thus omitted.

In FIG. 8, reference numeral 1 denotes the optical guide holding member having the holding holes 2 for optical guides and the electric wires 3, as well as the openings 4 on the mounting surface 8 from which the input or output ends of the optical guides are exposed. The optical guide holding member 1 is formed by injecting an epoxy resin into a mold. The electric leads 3 consist of a conductive member, for example, Cu, and their surfaces are plated with solder such as Au or SnAg. The electric leads 3 are at least partly exposed to allow the optical semiconductor device to be mounted on the mounting surface 8. The electric leads 3 include the alternately arranged signal wires 5 and common wires 7; the signal wires 5 are used to lead out high-speed signals, and the common wires 7 are used for a power source or ground.

This structure is similar to that of the first embodiment except that dummy wires 6 are provided on the mounting surface 8. Each of the signal wires 5 and the corresponding dummy wire 6 are arranged substantially symmetrically with respect to the corresponding opening 4 on the mounting surface 8. In other words, the dummy wire 6 is formed opposite the signal wire 5 via the opening 4. Each of the common wires 7 is installed so as to traverse the mounting surface 8 in a vertical direction, that is, a short-side direction. In other words, the common wire 7 is placed on the mounting surface 8 substantially symmetrically with respect to the openings 4.

The present embodiment has a structure basically similar to that of the first embodiment except for provision of the dummy wires 6, which improve the symmetry of the electric leads 3 with respect to the openings 4. Therefore, the present embodiment not only exerts effects similar to those of the first embodiment but also produces the following effect on the basis of the arrangement of the electric wiring.

During a thermal process for forming an optical guide holding member 1, stress is caused by the difference in the coefficient of thermal expansion between the base material of the optical guide holding member 1 and the metal of the electric leads 3. The second embodiment can make the stress symmetric within the principal surface 8, which is orthogonal to the axis direction of the holding holes 2 for optical guides. This structure therefore makes the deformation of the holding holes 2 axially symmetric, thus enabling displacement of relative position of the center axis of each holding hole 2 in the surface 8 to be minimized. The deformation of geometry of each holding hole 2 is also axially symmetric. Advantageously, this significantly simplifies the design for deformation caused by stress.

Figure 9:
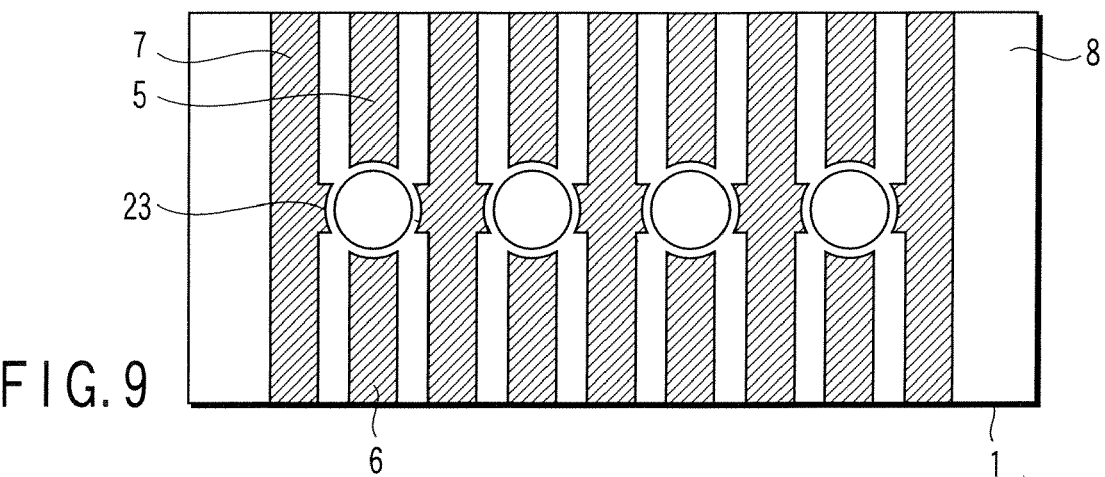
FIG. 9 is a plan view showing an electrode pattern on the optical guide holding member shown in FIG. 8.

Alternatively, those parts of the electric wires 5, 6, and 7 which are close to the openings 4 may be formed like circular arcs to the shape of the openings 4 so that the distances from the edges of the openings 4 to the electric wires 5, 6, and 7 are as equal as possible, as shown in FIG. 9. When the signal wires 5 and dummy wires 6 extend to an area closer to the openings 4 than the common wires 7, the following arrangement is used to further improve the symmetry of the wiring: a wire 23 is led out from each common wire so as to equalize the distances from the openings 4 to the signal wires 5, dummy wires 6, and common wires 7 as shown in FIG. 9. This arrangement improves the vertical and lateral symmetries of a stress distribution during a thermal process. This makes it possible to further suppress deformation of the external shape caused by straining of the holding holes 2.

Figure 10:
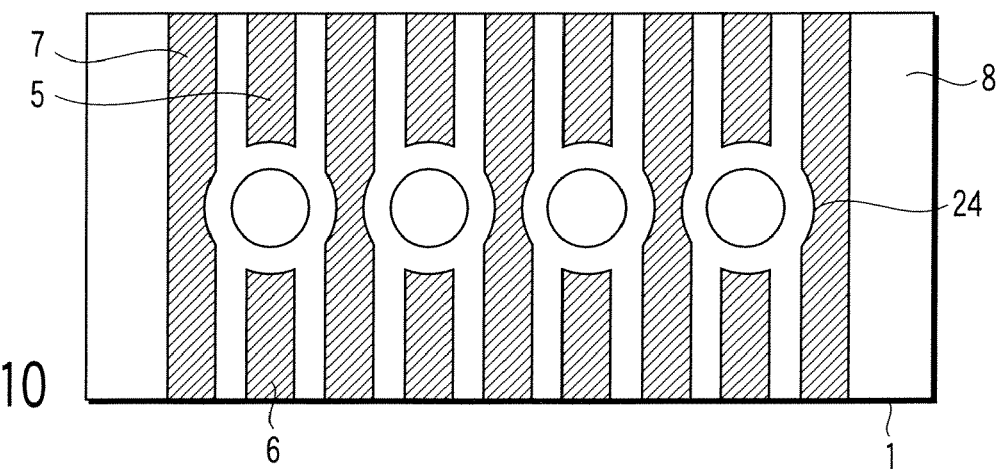
FIG. 10 is a plan view showing another electrode pattern on the optical guide holding member shown in FIG. 8.

If the signal wires 5 and dummy wires 6 are farther from the openings 4 than the common wires 7, each common wire 7 may be partly recessed as shown in FIG. 10. This arrangement also improves the vertical and lateral symmetries of the stress distribution during the thermal process. This makes it possible to further suppress deformation of the external shape caused by straining of the holding holes 2.

Fourth Embodiment

Figure 11:
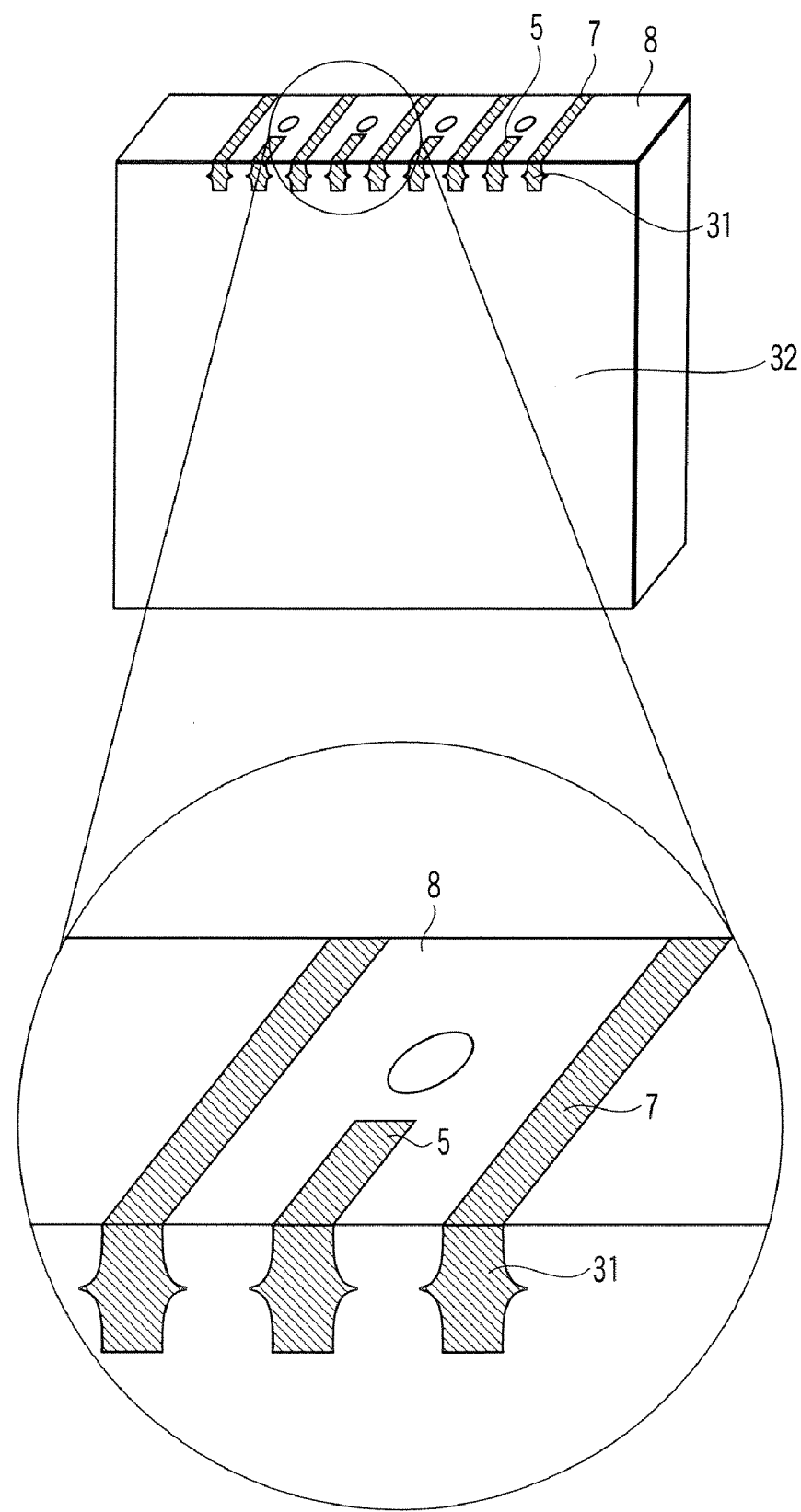
FIG. 11 is a perspective view schematically showing an optical guide holding member according to a fourth embodiment of the present invention as well as a partly enlarged view of the optical guide holding member.

FIG. 11 is a perspective view schematically showing an optical guide holding member according to a fourth embodiment of the present invention, and a partly enlarged view of the optical guide holding member. In the description of an optical module according to the fourth embodiment, the same components as those shown in FIG. 1 are denoted by the same reference numerals. Their detailed description is thus omitted.

The width of each electric lead tends to decrease consistently with the pitch of the electric leads. Thus, when the electric leads are buried in the optical guide holding member 1, this structure tends to reduce the area of the electric lead which contacts the base material of the holding member 1. This makes the tensile strength in the normal direction of the principal surface insufficient. Thus, the cross section of the electric lead is formed like a polygon instead of a simple rectangle to increase the tensile strength in the normal direction of the principal surface.

Specifically, as shown in FIG. 11, the cross section of the electric lead is such that the part of the electric lead which is exposed from the principal surface 8 is narrower than the part of the electric lead which is buried in the optical guide holding member 1. In other words, the sectional shape of the electric lead 3 (wires 5 and 7) along the principal surface is such that the electric lead 3 is wider in its deep burial part than in its burial surface part.

In this structure, the exposed portion 31 of the electric lead 3 is formed to be internally wider, thus enabling an increase in the tensile strength in the normal direction of the principal surface. This makes it possible to prevent the electric leads 3 from slipping out of the optical guide holding member 1, thus improving reliability. The above sectional shape can be easily formed by double-side etching during the formation of such a lead frame with the electric leads 3 as shown in FIG. 2.

Fifth Embodiment

Figure 12:
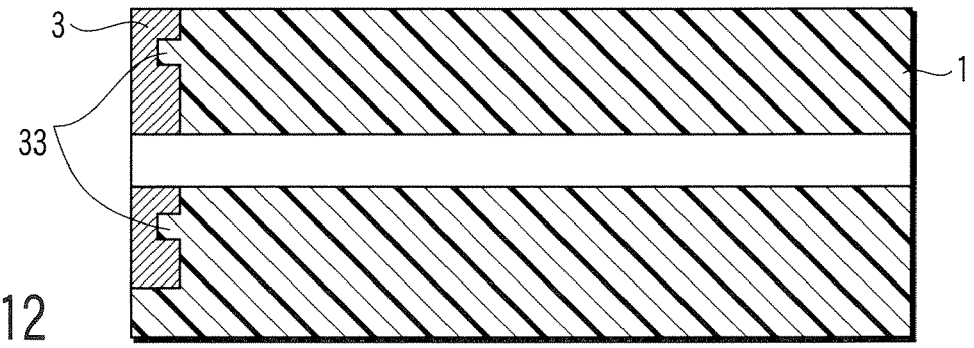
FIG. 12 is a sectional view schematically showing an optical guide holding member according to a fifth embodiment of the present invention.

FIG. 12 is a perspective view schematically showing an optical guide holding member according to a fifth embodiment of the present invention. In the description of an optical module according to the third embodiment, the same components as those shown in FIG. 1 are denoted by the same reference numerals. Their detailed description is thus omitted.

The optical guide holding member shown in FIG. 12 has a basic configuration similar to that of the first embodiment. In the present embodiment, the electric lead 3 has a recessed portion 33 that corresponds to a longitudinal part of the lead. In this structure, the recessed portion 33 bites into the base material of the optical guide holding member 1. This makes it possible to increase the tensile strength in a direction parallel to the principal surface. This structure can be easily formed by partial half etching during the formation of electric leads 3.

Figure 13:
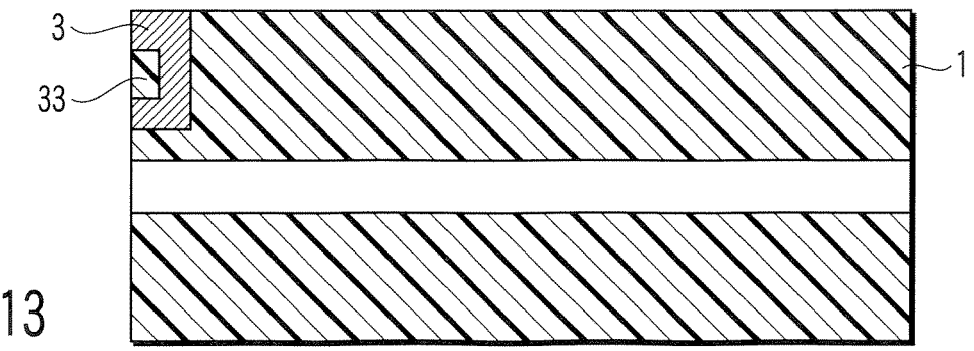
FIG. 13 is a sectional view schematically showing the optical guide holding member shown in FIG. 12.

The recessed portion 33 of the electric lead 3 may be exposed from the principal surface on which the openings 4 of the holding holes 2 are located as shown in FIG. 13. In this case, the electric leads 3 partly exposed from the principal surface 8 can form a pattern. Then, aligning this pattern with the bonding pattern of the optical semiconductor device eliminates the need to plate the entire electric lead with solder except for the exposed portion. This makes it possible to prevent failures such as chip misalignment or a short circuit resulting from a running solder.

(Variation)

The present invention is not limited to the above embodiments. In the embodiments, the cut surfaces of the electric leads are flush with the side surface adjacent to the mounting surface. However, the electric leads may project out from the side surface. In the embodiments, the optical fibers are used as optical guides. However, optical waveguides may be used. Moreover, it is possible to change the base material of the optical guide holding member and the materials of the electric wires and the like as required for specifications.

According to the present invention, the electric leads are buried in the first surface of the optical guide holding member on which one of the openings of each of the holding holes is located, that is, in the mounting surface. The ends of the electric leads are exposed from the second surface adjacent to the first surface. This enables electrode pads for electrode lead-out to be provided on the second surface without the need to form three-dimensional wiring. Consequently, the optical semiconductor device can be inexpensively optically coupled directly with the optical guides such as optical fibers. This makes it possible to easily establish the three-dimensional electric connection between an optical module and its mounting board.

Therefore, according to the optical guide holding member and the optical module using this optical guide holding member, as described above, the optical semiconductor device can be inexpensively optically coupled directly with the optical guides such as optical fibers. This makes it possible to stably and easily form three-dimensional electric wiring between the optical element mounting surface and the board mounting surface. The optical fibers can also be arranged parallel to the mounting board.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A holding member for holding an optical guide, comprising:
   a member having a first surface and a second surface adjacent to the first surface, and a through hole having an opening on the first surface, the through hole being extended in the member so as to hold the optical guide; and
   electrical leads each having, first and second opposite ends, the electrical leads buried in the member such that the first opposite end of the electrical lead is partly exposed on the first surface of the member and arranged in the member such that the second opposite end of the electrical lead is exposed on the second surface of the member adjacent to the first surface of the member.

2. The holding member according to claim 1, wherein the second opposite end of the electrical lead is formed as a connection point to be connected to an external device.

3. The holding member according to claim 1, wherein a part of the first opposite end of the electrical lead exposed on the first surface and the second opposite end exposed on the second surface are both plated with metal.

4. The holding member according to claim 2, wherein a part of the first opposite end of the electrical lead exposed on the first surface and the second opposite end exposed on the second surface are both plated with metal.

5. The holding member according to claim 4, wherein the member is made of a resin material with glass fillers, the electrical lead comprises Cu, a Cu alloy, a 42 alloy, or an invar material, and the metal plating comprises a single layer made of a material selected from the group essentially consisting of Ni, Au, AgSn, AuSn, SnAgCu, SnZnBi, SnAgIn, SnBiAg, or SnPb, or a multilayer made of a combination of materials selected from the group essentially consisting of Ni, Au, AgSn, AuSn, SnAgCu, SnZnBi, SnAgIn, SnBiAg, or SnPb.

6. The holding member according to claim 1, wherein the opening has a center and the electrical leads are arranged point-symmetrically with respect to the center of the opening.

7. The holding member according to claim 1, wherein the electrical lead has a first width of the exposed part on the first surface in the cross section parallel to the second surface and a second width parallel to the direction of the first width which is wider than the first width.

8. The holding member according to claim 1, wherein the electrical lead has a recessed portion which is buried in the member.

9. An optical module comprising:
an optical guide;
a member having a first surface and a second surface adjacent to the first surface and a through hole having an opening on the first surface, the through hole being extended in the member and the optical guide being held in the through hole;
electrical leads each having, first and second opposite ends, the electrical leads buried in the main body such that the first opposite end of the electrical lead is partly exposed on the first surface of the member and arranged in the main body such that the second opposite end of the electrical lead is exposed on the second surface of the member adjacent to the first surface of the member; and
an optical semiconductor device mounted on the first surface and having electrodes which are electrically connected to the exposed part of the electrical leads.

10. The optical module according to claim 9, further comprising a drive IC or a receiver IC which drives the optical semiconductor device or receives output of the optical semiconductor device to which the second end of the electrical lead is electrically connected.

11. The optical module according to claim 9, further comprising other optical guides, wherein the member has other through holes each having an opening on the first surface, the other through holes being extended in the member and the other optical guides being held in the other through holes, respectively.

12. The optical module according to claim 9, wherein the second end of the electrical lead is formed as a connection point to be connected to an external device.

13. The optical module according to claim 9, wherein a part of the electrical lead exposed on the first surface and the second end exposed on the second surface are both plated with metal.

14. The optical module according to claim 13, wherein the member is made of a resin material with glass fillers, the electrical lead comprises Cu, a Cu alloy, a 42 alloy, or an invar material, and the metal plating comprises a single layer made of a material selected from the group essentially consisting of Ni, Au, AgSn, AuSn, SnAgCu, SnZnBi, SnAgIn, SnBiAg, or SnPb, or a multilayer made of a combination of materials selected from the group essentially consisting of by a combination of Ni, Au, AgSn, AuSn, SnAgCu, SnZnBi SnAgIn, SnBiAg, or SnPb.

15. The optical module according to claim 9, wherein the opening has a center and the electrical leads are arranged point-symmetrically with respect to the center of the opening.

16. The optical module according to claim 9, wherein the electrical lead has a first width of the exposed part on the first surface in the cross section parallel to the second surface and a second width parallel to the direction of the first width which is wider than the first width.

17. The optical module according to claim 9, wherein the electrical lead has a recessed portion which is buried in the member.

* * * * *